United States Patent [19]

Potter

[11] 4,405,609

[45] Sep. 20, 1983

[54] COMBINATION AND METHOD FOR INCREASING FEED UTILIZATION EFFICIENCY IN RUMINANTS

[75] Inventor: Emerson L. Potter, Greenfield, Ind.

[73] Assignee: Eli Lilly and Company, Indianapolis, Ind.

[21] Appl. No.: 443,791

[22] Filed: Nov. 22, 1982

Related U.S. Application Data

[63] Continuation-in-part of Ser. No. 397,325, Jul. 12, 1982, abandoned, which is a continuation of Ser. No. 227,572, Jan. 22, 1981, abandoned.

[51] Int. Cl.³ .................... A61K 37/00; A61K 31/71
[52] U.S. Cl. .................... 424/177; 424/115; 424/181; 424/244; 424/283
[58] Field of Search ............ 424/115, 177, 181, 244, 424/283

[56] References Cited

U.S. PATENT DOCUMENTS

| | | | |
|---|---|---|---|
| 3,832,462 | 8/1974 | Shu | 424/123 |
| 3,839,557 | 10/1974 | Raun | 424/115 |
| 3,928,571 | 12/1975 | Raun | 424/118 |
| 4,211,775 | 7/1980 | Ioset | 424/225 |

FOREIGN PATENT DOCUMENTS

864342 8/1978 Belgium.

OTHER PUBLICATIONS

McGahren et al., *J. Am. Chem. Soc.,* 102, 1671 (1980).
Trevis, Feedstuffs 1979, 51(42), 20 cf. Chem. Abs. 92:4993y, 1980.
Horton et al., Am. Soc. Anim. Sci., 1979, 30, 251-4; cf. Chem. Abstracts, 92:5268c, 1980.
Raun et al., *J. of Anim. Sci.,* 43, No. 3, (1976), pp. 670-677.
Sherrod et al., Am. Soc. Anim. Sci., 1979, 30, 271-4; cf. Chem. Abs. 192:5270X (1980).

*Primary Examiner*—Sam Rosen
*Attorney, Agent, or Firm*—Charles W. Ashbrook; Arthur R. Whale

[57] ABSTRACT

Compositions of polyether antibiotic rumen propionate enhancers and glycopeptide rumen propionate enhancers are effective in increasing the efficiency of feed utilization in ruminants. A method for increasing rumen propionate production in ruminants having a developed rumen function is provided. Such increase in rumen propionate production is synonymous with increased efficiency of feed utilization.

29 Claims, No Drawings

COMBINATION AND METHOD FOR INCREASING FEED UTILIZATION EFFICIENCY IN RUMINANTS

CROSS REFERENCE TO RELATED APPLICATIONS

This is a continuation-in-part of Ser. No. 397,325 filed July 12, 1982, which is a continuation of Ser. No. 227,572 filed Jan. 22, 1981, both now abandoned.

BACKGROUND OF THE INVENTION

A number of chemical agents are known which are effective in increasing the efficiency of feed utilization by ruminants. Monensin, for instance, has found widespread success in promoting feed efficiency in ruminants such as cattle and sheep. Monensin, and numerous other polyether antibiotics and related compounds, function by altering the mechanism of ruminant feed utilization, which mechanism involves fermentation. Microorganisms in the developed rumen of a ruminant animal degrade carbohydrates (the major nutritive portion of ruminant feeds) to produce pyruvates. Pyruvates are further metabolized by microbiological processes to form acetates, butyrates and propionates. These latter compounds are collectively referred to as volatile fatty acids (VFA's). While acetates, butyrates and propionates all are utilized in the growth mechanism and in energy production, the propionates are more efficiently produced and utilized than either the acetates or the butyrates. Some of the known growth promoters and feed utilization enhancers thus function in ruminants having a developed rumen function by increasing the formation of propionates from carbohydrates, at the expense of acetate and butyrate production.

Raun et al., in *J. Ani. Sci.*, 43, 670 (1976), demonstrate that the effectiveness of monensin on feed efficiency reaches a maximum at a dose level of about 30 grams per ton of feed. A similar maximum in effectiveness at a particular dose level is observed with most other feed efficiency enhancers, including the glycopeptides such as avoparcin, actaplanin and the like. This maximum effectiveness has been considered due to an inability to increase propionate production in the rumen beyond a certain level.

It therefore is surprising that the administration of a combination of feed efficiency enhancing agents selected from a glycopeptide and a polyether to an animal having a developed rumen function causes a greater affect upon feed efficiency (i.e., a greater production of propionate) than effected by either agent when administered alone at an optimal dose level. An object of this invention is to provide a combination of feed efficiency enhancing agents which is surprisingly effective in increasing the efficiency of feed utilization in such animals.

SUMMARY OF THE INVENTION

This invention relates to a combination of active ingredients useful in promoting growth and increasing feed utilization efficiency in ruminants, and to a method for increasing the efficiency of feed utilization in ruminants utilizing such combination. The invention is more particularly directed to a composition comprised of a polyether antibiotic and a glycopeptide antibiotic. The compositions of this invention exhibit an unexpected interaction such that an unexpected increase in the efficiency of ruminant feed utilization is realized. The components can be employed in amounts that are less than or equal to their respective optimal dose levels when used alone.

The invention additionally provides a method for increasing the efficiency of feed utilization by ruminants comprising orally administering to an animal having a developed rumen function a combination of a polyether antibiotic and a glycopeptide antibiotic.

DETAILED DESCRIPTION OF THE INVENTION

The compounds to be employed in the compositions provided by this invention are well known in the art. A number of such compounds are in commercial use.

The polyether antibiotics to be employed according to this invention are a class of antibiotics produced by the Streptomyces genus of microorganisms. They are characterized by comprising a multiplicity of cyclic ethers in their structures. The class is reviewed in *Kirk-Othmer: Encyclopedia of Chemical Technology*, Vol. 3, Third Edition (John Wiley & Sons, Ind., 1978), page 47 et seq.; in *Annual Reports* in *Medical Chemistry* Volume 10 (Academic Press, N.Y. 1975), page 246 et seq.; and in *J. Chrom. Lib.*, Vol. 15 (Elsevier Scientific Publishing Co., N.Y. 1978), page 488 et seq.

Like other products of fermentation origin, many of the polyether antibiotics comprise more than one factor. The various factors are all usable in the present invention. Further, many of these antibiotics readily form ethers, esters, salts, or other derivatives, which are either active as such or are converted in vivo to the basic antibiotic. Such derivatives can also be employed in the present invention. All that is necessary is that an active moiety of a polyether antibiotic which is effective in increasing propionate production in a developed rumen be delivered in vivo.

Representative of the polyether antibiotics to be employed in the combination of this invention include ruminal propionate enhancers such as monensin (including the various factors A, B, and C, and the alkali metal salts, for instance monensin sodium, and the various esters thereof), ionomycin, laidlomycin, nigericin, grisorixin, dianemycin, Compound 51,532, lenoremycin, salinomycin, narasin, lonomycin, antibiotic X206, alborixin, septamycin, antibiotic A204, Compound 47,224, etheromycin, lasalocid (factors A, B, C, D, and E), mutalomycin, K41, isolasalocid A, lysocellin, and antibiotics X-14766A, A23187 and A32887.

Preferred polyether antibiotics include monensin, narasin, lasalocid, salinomycin, A-204, lonomycin, X-206, nigericin, and dianemycin, and especially monensin, narasin, lasalocid and salinomycin.

An especially preferred polyether to be utilized according to this invention is monensin, a compound widely used in the improvement of feed utilization in ruminants (see U.S. Pat. No. 3,839,557). As used herein, "monensin" includes the various active factors, the salts such as monensin sodium, and the monensin esters such as carbamate esters and the like.

Another especially preferred polyether to be employed in the combinations and method of this invention is narasin, a complex of related factors also referred to as A-28086. Narasin is produced by submerged aerobic fermentation of *Streptomyces aureofaciens* NRRL 5758. As used herein, "narasin" includes the various active factors A, B and D, and esters and physiologically-acceptable salts thereof. A typically preferred ester of narasin is a lower alkyl ester such as the methyl ester.

Like the polyether antibiotics mentioned hereinabove, the glycopeptide ruminal propionate enhancers to be employed in the combination of this invention are well known to those skilled in the art. Typical of such glycopeptide feed utilization efficiency enhancers are actaplanin, avoparcin, A35512, A477, ristocetin, vancomycin, and related glycopeptides.

Preferred glycopeptides to be employed in the combinations of this invention include actaplanin, avoparacin, ristocetin, and vancomycin.

A particularly preferred composition contemplated by this invention includes as one component the polyether antibiotic monensin, in combination with a glycopeptide selected from actaplanin or avoparacin. A preferred combination provided herein is monensin and actaplanin. Another preferred combination is narasin and actaplanin.

As hereinabove pointed out, the components of the compositions provided herein are well known in the art, and many are widely used commercially. Monensin, for instance, was first disclosed in U.S. Pat. No. 3,501,568. Salts and esters of monensin, as well as the use thereof for increasing feed efficiency in ruminants, are described in U.S. Pat. No. 3,839,557. A number of carbamate esters of monensin which are useful in growth promotion are described in European Pat. No. 11-859. All of these references, as well as those recited hereinafter, are incorporated herein by reference for their disclosure of the active components of the compositions of this invention and the use of the individual components in improving feed utilization efficiency in ruminants.

U.S. Pat. No. 3,794,732 describes the polyether antibiotics A204, lasalocid (X-537A), dianemycin, monensin, nigericin and X-206, and their use in the improvement of ruminant feed utilization.

Ionomycin is a polyether obtained by cultivating the microorganism *Streptomyces conglobatus* ATCC No. 31005. The production of ionomycin and its properties are described in detail in U.S. Pat. No. 3,873,693.

The antimycoplasmal polyether antibiotic laidlomycin is produced by cultivating a strain of *Streptomyces curocidicus.* Laidlomycin is described by Kitame et al. in *J. Antibiot.,* 27, 884–888 (1974).

Grisorixin is a polyether antibiotic which is also known as deoxynigericin. As already noted, nigericin is described in U.S. Pat. No. 3,794,732. The preparation of deoxynigericin, or grisorixin, is carried out as discussed in French Pat. No. 2,097,053.

Cultivation of a microorganism belonging to the *Streptomyces hydroscopicus* species, ATCC No. 21840, produces the polyether known as lenoremycin, also referred to as "antibiotic A-130A". The properties of this antibiotic are detailed in U.S. Pat. No. 3,903,264.

U.S. Pat. Nos. 4,038,384 and 4,085,224 describe the preparation and use of narasin and salinomycin. Narasin is referred to therein as A-28086.

Lonomycin is a polyether antibiotic produced from *Streptomyces ribosidificus*, ATCC No. 31051. The compound, also known as "antibiotic TM 481", "antibiotic DE 3936" and "emericid" is described in detail in *J. Antibiotics,* 29, No. 1, 15-20 (1976). Derivatives of lonomycin are described in U.S. Pat. No. 4,199,515.

Cultivation of *Streptomyces hygroscopicus* NRRL 5077 produces the polyether antibiotic known as alborixin, also referred to as "S 14750/A". Alborixin is described in British Pat. No. 1,541,485.

Septamycin is the name given to a group of antibiotics initially referred to as "antibiotics A28695A and A28695B" and also known as "BL580". The polyether is produced by culturing *Streptomyces albus* strain NRRL 3883. The process for preparing septamycin is disclosed in U.S. Pat. Nos. 3,839,558 and 4,189,537.

Lasalocid is a polyether antibiotic designated as "antibiotic X-537A" and prepared by cultivation of Streptomyces NRRL 3382. The antibiotic is comprised of several factors. Lasalocid and derivatives thereof are described in U.S. Pat. No. 3,715,372. Iso-lasalocid A is an isomer of lasalocid A as described in U.S. Pat. No. 3,944,573.

U.S. Pat. No. 4,129,578 refers to several members of the class of polycyclic ether antibiotics. The reference is specifically directed to etheromycin, a compound also known as "antibiotic 38295" and "CP 38295". The compound is valuable as a ruminant growth promoting agent.

Mutalamycin is a polyether derivative of lonomycin and is described in Belgian Pat. No. 845,708. The compound is also known as "antibiotic S 11743A".

Cultivation of *Streptomyces hydroscopicus* ATCC 31,227 produces a polyether known as antibiotic K-41. The compound is described in British Pat. No. 2,028,134 and *J. Antibiotics,* 29, 10–14 (1976). Other designations for K-41 include "antibiotic 37454RP".

Lysocellin is produced by cultivation of *Streptomyces longwoodensis* ATCC 29,251. Such preparation is described in U.S. Pat. No. 4,033,823.

Antibiotic A23187 is described in U.S. Pat. No. 3,923,823. This polyether antibiotic is also known as "A23187", "Ionophore A23187" and "Calcimycin". The compound is produced from *Streptomyces chartreusis* NRRL 3882.

Submerged aerobic fermentation of *Streptomyces albus* NRRL 11,109 produces antibiotic A-32887. As noted in U.S. Pat. No. 4,132,778, this polyether antibiotic and its various derivatives are useful in increasing feed utilization efficiency in ruminants.

U.S. Pat. No. 4,221,724 describes a new polyether ionophore antibiotic referred to as antibiotic X-14766A. This compound prevents and treats ketosis as well as improves feed utilization in ruminants.

U.S. Pat. Nos. 4,150,152 and 4,195,079 describe, respectively, new polyethers referred to as "Compound 47,224" and "Compound 51,532". These antibiotics appear to resemble polycyclic ethers such as monensin, nigericin, grisorixin, dianemycin and salinomycin.

The polyether antibiotics such as those described above are employed in combination with a glycopeptide antibiotic which is known to increase ruminant feed utilization efficiency. The latter compounds comprise a known class of water-soluble glycopeptide antibiotics active against gram-positive bacteria.

U.S. Pat. No. 3,928,571 describes the use of various members of the glycopeptide class in the improvement of ruminant feed utilization. Specifically described are the antibiotics known as A477, A-4696 (also known as actaplanin), vancomycin, and ristocetin. A preferred embodiment of this invention employs actaplanin as the glycopeptide component.

The glycopeptide antibiotics A-35512 are a closely related group of factors produced by fermentation of *Streptomyces candidus* NRRL 8156. A-35512 is discussed in detail in U.S. Pat. No. 4,083,964. This group of antibiotics also is closely related to the glycopeptide AV290, which is also now known as avoparcin. Avoparcin is also a complex of antibiotics, but is composed primarily of two main factors. The production of avoparcin is described in U.S. Pat. No. 3,338,786, and its structure is discussed by McGahren et al. in *J. Am. Chem. Soc.*, 102, 1671–1680 (1980).

As already pointed out, this invention provides a composition comprising a polyether antibiotic and a glycopeptide antibiotic. The components of the present composition are employed in amounts which, in combination, produce an unexpected interaction. The composition causes the production of a larger amount of propionate in the rumen of an animal having a developed rumen function than caused by either active component when administered alone. The net affect of such unexpected increase in propionate production is a correspondingly unexpected increase in the efficiency of feed utilization. Accordingly, the invention provides a composition useful for improving the efficiency of feed utilization by ruminants having a developed rumen function comprising as a first component a polyether antibiotic and as a second component a glycopeptide antibiotic, said components being present in amounts which, in combination, demonstrate an interaction, or in amounts which are about their respective optimal amounts when employed alone.

The compositions provided herein comprise a polyether as defined above and a glycopeptide as defined above. The respective components will be present on a weight basis in a ratio of about 1 to about 10 parts polyether together with about 1 to about 10 parts glycopeptide. For example, a polyether such as narasin will be employed at a concentration level of about 1 to about 20 grams per ton of ruminant feedstuff, together with a glycopeptide such as avoparcin or actaplanin at a concentration level of about 5 to about 50 grams per ton of ruminant feedstuff. A particularly preferred embodiment of the invention is a combination of narasin at about 2 to about 10 grams per ton of feedstuff, and actaplanin at about 5 to about 20 grams per ton. Such combination exhibits an unexpected interaction to such extent that the increase in efficiency of ruminant feed utilization is greater than that achieved with either component when employed alone at its respective optimal dose level. Typically, the maximal doses of each component to be employed in accordance with the present invention are substantially the same as the maximal doses for effective growth promotion and feed utilization enhancement by the individual components. For example, monensin has been demonstrated to cause a maximal improvement in feed efficiency at a dose level of about 30 grams per ton of feed, or a dosage level of about 33 ppm (see Raun et al., *J. Ani. Sci.* 43, 670 (1976)). Similarly, actaplanin at a dose of about 30 grams per ton of feed effects the largest increase in propionate production observed with that agent. According to the present invention, there is thus provided a preferred combination comprising monensin as a first component, ideally commercial monensin sodium which includes primarily factor A with a small amount of factor B, and actaplanin as a second component. Normally such combination will be added to a ruminant feedstuff such that the dose level is about 15 to about 50 grams per ton of monensin and about 15 to about 50 grams per ton of actaplanin. A preferred combination according to this invention comprises about 30 grams of monensin and about 30 grams of actaplanin, said dose of combination being administered per ton of feedstuff.

Also preferred are combinations that comprise a polyether and a glycopeptide at concentrations that are less than their respective optimal levels when employed alone. When such sub-optimal concentration levels are employed, the combinations demonstrate an unexpected interaction so that feed utilization efficiency is increased to an unexpected degree. Exemplary combinations comprising sub-optimal concentrations of components per ton of feedstuff include 8 grams of narasin and 15 grams of actaplanin; 10 grams of monensin and 20 grams of actaplanin; 10 grams of narasin and 5 grams of avoparcin; and 5 grams of narasin and 12 grams of actaplanin.

Additional exemplary combinations provided by this invention include the following, which are presented in grams of each component, said combination to be administered per ton of animal feedstuff.

30 grams monensin—40 grams avoparcin;
20 grams monensin—40 grams ristocetin;
35 grams monensin—30 grams vancomycin;
20 grams narasin—20 grams actaplanin;
5.0 grams narasin—8.0 grams actaplanin;
25 grams narasin—30 grams avoparcin;
10 grams narasin—10 grams avoparcin;
40 grams lasalocid—30 grams actaplanin;
20 grams lasalocid—25 grams avoparcin;
30 grams dianemycin—30 grams actaplanin;
45 grams dianemycin—25 grams A477;
50 grams alborixin—20 grams avoparcin;
60 grams alborixin—10 grams vancomycin;
10 grams ionomycin—20 grams actaplanin;
5.0 grams ionomycin—10 grams actaplanin;
25 grams ionomycin—30 grams A35512;
40 grams septamycin—50 grams ristocetin;
60 grams septamycin—20 grams A35512
28 grams etheromycin—32 grams actaplanin;
15 grams lysocellin—20 grams ristocetin;
30 grams lysocellin—25 grams actaplanin;
30 grams lysocellin—30 grams avoparacin;
12 grams isolasalocid A—24 grams avoparcin;
20 grams isolasalocid A—30 grams actaplanin;
50 grams A-204—20 grams ristocetin;
60 grams K41—40 grams actaplanin;
22 grams lonomycin—44 grams A-35512;
5.0 grams monensin—5.0 grams actaplanin;
8.0 grams narasin—12 grams actaplanin;
2.0 grams narasin—10 grams actaplanin;
40 grams lonomycin—20 grams A-477;
20 grams dianemycin—20 grams avoparcin;
5.0 grams dianemycin—10 grams avoparcin;
30 grams salinomycin—20 grams vancomycin;
40 grams salinomycin—20 grams actaplanin;
20 grams salinomycin—10 grams actaplanin;
30 grams lenoremycin—30 grams avoparcin;
and related combinations.

It has been discovered that when the components of the present combination are employed in amounts which are less than their respective optimal doses when employed alone, that the components interact with one another to provide a synergistic feed efficiency result. When the components are employed in amounts that are about their respective optimal doses when employed alone, the increase in feed efficiency is unexpectedly greater than that which is observed with either component employed at its individual optimal dose level.

The combination provided by this invention can be administered to ruminant animals orally, for example by being admixed with a suitable carrier such as a normal daily ruminant feed regimen. Such method is especially preferred for feeder calves at the feedlot stage of development. A typical feedstuff for feed lot animals has the following composition.

| Ingredient | Percent |
|---|---|
| Coarse ground corn | 69.95 |
| Ground corncobs | 10.00 |
| Soybean meal (50% protein) | 8.00 |
| Alfalfa meal | 5.00 |
| Molasses | 5.00 |
| Urea | 0.60 |
| Dicalcium phosphate | 0.50 |
| Calcium carbonate | 0.50 |
| Salt | 0.30 |
| Vitamin A and $D_2$ premix | 0.07 |
| Vitamin E premix | 0.05 |
| Trace mineral premix | 0.03 |
|  | 100.00 |

A combination of this invention, for instance a 1:1 combination of monensin and avoparcin, is then added to such feedstuff at the rate of about 40 to about 100 grams of such combination per ton of feedstuff. Such feedstuff then is administered to the ruminant animals at the rate of about 5 to about 30 pounds each day. Such treatment effects an increased rate of feed utilization and promotes growth. The combinations provided by this invention can also be utilized with feed rations such as grass, silage, and the like, and can be administered to range fed unconfined animals as well as to confined feedlot animals.

An alternative and often preferred method of administration for the compositions of this invention comprises formulation of such combinations in the form of a controlled release rumen retained bolus. Oral administration of one or more controlled release boluses then provides uniform delivery of the active ingredient to the ruminant over a prolonged period of time, for instance for about three months or longer. Controlled release of the compositions of this invention is a particularly preferred method of administration to be practiced on range fed ruminants, such as range fed feeder calves and the like.

Controlled release formulations comprising a composition of this invention and a carrier can be prepared by mixing a suitable combination as hereinabove described with a copolymer derived from the condensation of about 60 to about 95 parts by weight of lactic acid and about 40 to about 5 parts by weight of glycolic acid. For example, a composition of about 20 grams of monensin and about 20 grams of avoparcin can be mixed with about 80 grams of a copolymer derived from about 80 parts lactic acid and about 20 parts glycolic acid. The mixture so formed can be molded into the form of a tablet, or preferably the composition is loaded into a steel cylinder open at both ends, or some similar delivery device. Such loaded cylinder is ideally suited to oral administration to a feeder calf, and is of sufficient density to be retained in the reticulo-rumen of the animal until the time of slaughter. The formulated composition of this invention is slowly degraded such that the animal continuously receives an effective amount of feed efficiency enhancers over about a three month period. Such method of administration is ideally suited for the treatment of range fed ruminants, particularly cattle raised for human consumption.

Still another method for oral administration of the composition of this invention is in the form of licks, lick tank supplements, self limiting supplements, water, and the like. The composition can, for example, be uniformly dispersed throughout a salt block or mineral block. The block can be placed in a feed lot, on the open range, in the feeding bin, or in similar locations for easy access by the animals.

Compositions provided by this invention have been demonstrated effective in experiments designed to measure the amount of increase in feed utilization. For example, in a typical in vivo evaluation of the combination of monensin and actaplanin, feeder calves were fed a high-grain ration such as that recited above. Fifteen control animals received the feed ration with no feed efficiency enhancer additive. Another group of fifteen calves received the feed ration containing monensin at 30 grams per ton, while a third group of fifteen animals received the feed ration with actaplanin at 30 grams per ton. A combination of 30 grams per ton of monensin and 30 grams per ton of actaplanin was administered as a feed additive to the ration consumed by a fourth group of fifteen test animals. The control animals receiving the feed ration having no feed efficiency enhancer additive exhibited an average daily weight gain of 1.27 pounds. The feed efficiency of such control group, calculated as the pounds of feed consumption required for one pound of animal weight gain, was 13.49. The group receiving monensin as a feed additive gained 1.42 pounds per day, a feed efficiency of 12.05, while the actaplanin group had an average daily gain of 1.38 pounds, a feed efficiency of 12.36. Surprisingly, the group receiving the combination of this invention exhibited a 1.54 pound daily gain, for a feed efficiency of only 11.08 pounds of feed for each pound of weight gain. The result of this test demonstrates that production costs of fattening cattle for slaughter can be significantly reduced by utilizing a combination of feed efficiency enhancers according to this invention.

An in vitro assay was designed to demonstrate the increase in propionate production effected by the combinations of this invention. Rumen fluid was obtained from steers which had surgically-installed fistula openings into the rumen. The steers were maintained on a high-grain ration such as the one described above.

A sample of rumen fluid was strained through four layers of cheese cloth and the eluate was collected in vacuum bottles. The particulate matter retained by the cheese cloth was resuspended in enough physiological buffer to return it to the original volume of the rumen fluid, and the eluate was strained again. The buffer utilized is described by Cheng et al., *J. Dairy Sci.*, 38, 1225 (1955).

The two eluates were combined in a separatory funnel and allowed to stand until any remaining particulate matter separated to the top. The clear liquid layer then was removed, diluted with an equal volume of the above-mentioned buffer, and the pH of the solution was adjusted to 7.0.

Fermenter flasks were then changed with the rumen liquor thus prepared. Two fermentor flasks were used per each treatment group. The fermentor flasks were allowed to stand for four days for equilibration, and then measurements of proprionate production were made daily for six days in order to establish a control. Measurements were made by gas chromatographic methods. The fermenter flasks were then fed 20 grams per day of a finely ground ration composed of 20 percent high concentrate ration and 80 percent alfalfa hay. The individual feed efficiency enhancers, and the composition of such enhancers provided by this invention, were added to the feed and dried thereon prior to introduction of the feed ration into the fermentor flasks. The feed ration was introduced into the flasks approximately two times each day. After the initial administration of active ingredient, two days were allowed for reequilibration, and then the volatile fatty acid (VFA) production in each flask was monitored by gas chromatography for five days. The results are presented in the following table.

TABLE I

| Monensin PPM | Actaplanin PPM | Propionate Production mM/24 hours |
|---|---|---|
| 0 | 0 | 11.4 ± 2.1 SD |
| 0 | 1 | 13.0 ± 2.0 |
| 0 | 4 | 19.9 ± 3.0 |
| 0.5 | 0 | 14.2 ± 1.7 |
| 0.5 | 1 | 16.8 ± 2.8 |
| 0.5 | 4 | 21.3 ± 2.2 |
| 3 | 0 | 18.4 ± 3.2 |
| 3 | 1 | 20.9 ± 2.0 |
| 3 | 4 | 22.4 ± 2.0 |

The data thus generated demonstrates that a combination of suboptimal amounts of actaplanin and monensin according to this invention is synergistic in the ability to increase propionate production to levels higher than that obtainable with optimal doses of either component alone. Accordingly, the compositions provided by this invention are valuable in enhancing feed utilization efficiency in ruminants and effecting an overall economic savings to meat producers.

Several additional in vivo studies have been conducted to demonstrate the unexpected interaction between a polyether and a glycopeptide according to this invention, and the resulting unexpected efficacy of the combination in ruminant feed utilization. One such study to demonstrate the interaction of monensin and actaplanin was carried out employing two hundred forty Hereford crossbred steers averaging approximately eight months in age and 485 pounds in weight. The animals were divided into a control group and into eleven test groups. All animals were fed a corn silage diet ad libitum once daily throughout the 140-day study, plus two pounds per head per day of the following cattle supplement:

| Ingredient | Percent by Weight |
|---|---|
| Alfalfa meal | 13.00 |
| Animal fat | 2.00 |
| Soybean meal | 74.50 |
| Trace mineral premix | 0.30 |
| Calcium carbonate | 6.00 |
| Dicalcium Phosphate | 2.00 |
| Salt | 1.00 |
| Vitamin E Premix | 0.50 |
| Vitamin A-D3 Premix | 0.70 |
| | 100.00 |

Test compounds were formulated as a premix with 50 percent by weight of ground corn cobs and 48 percent by weight of ground corn. The premixes were added to the corn silage feed rations in amounts necessary to provide the desired doses of active ingredients to the test animals. The results of the study are presented in the following Table II. The data are presented as the average for the entire group of animals receiving a particular dose of active agent.

TABLE II

| Monensin grams/Ton | Actaplanin grams/Ton | Number of Animals | Average Daily Weight Gain (lbs) | % change over control | Average Daily Dry Matter Intake (lbs) | % change from control | Feed Efficiency | % change from control |
|---|---|---|---|---|---|---|---|---|
| 0 | 0 | 20 | 2.23 | 0 | 12.35 | 0 | 5.54 | 0 |
| 10 | 0 | 19[a] | 2.45 | +9.9 | 13.54 | +9.6 | 5.52 | −0.3 |
| 30 | 0 | 20 | 2.39 | +7.2 | 12.94 | +4.8 | 5.42 | −2.2 |
| 0 | 10 | 20 | 2.44 | +9.4 | 12.86 | +4.1 | 5.28 | −4.9 |
| 0 | 20 | 20 | 2.37 | +6.3 | 12.86 | +4.1 | 5.43 | −2.0 |
| 0 | 40 | 20 | 2.39 | +7.2 | 12.47 | +1.0 | 5.22 | −6.1 |
| 10 | 10 | 20 | 2.51 | +12.6 | 13.23 | +7.1 | 5.27 | −5.1 |
| 30 | 10 | 20 | 2.39 | +7.2 | 12.12 | −1.9 | 5.06 | −9.5 |
| 10 | 20 | 20 | 2.47 | +10.8 | 12.71 | −2.9 | 5.16 | −7.4 |
| 30 | 20 | 19[b] | 2.41 | +8.1 | 12.52 | +1.4 | 5.21 | −6.3 |
| 10 | 40 | 19[c] | 2.55 | +14.3 | 12.41 | +6.5 | 4.88 | −13.5 |
| 30 | 40 | 19[d] | 2.33 | +4.5 | 11.54 | −7.0 | 4.95 | −11.9 |

[a] one steer removed from study because of blocked esophagus
[b] one steer removed from study because of blocked esophagus
[c] one steer removed from study because of pneumonia
[d] one steer removed from study because of esophageal abscess In the foregoing table, the Feed Efficiency value is calculated by dividing the average amount of feed consumed (pounds of dry matter intake) by the average daily gain in weight (in pounds). Ideally, the animals will gain more weight on less feed intake. Accordingly, the most improvement in feed utilization efficiency is represented by smaller numbers. The data in Table II clearly show that combinations of monensin and actaplanin provided by this invention improve feed efficiency more than the individual components when employed alone. The greatest improvements in the above study were achieved with combinations of 30 g./T. of monensin and 10 g./T. of actaplanin, 10 g./T. of monensin and 40 g./T. of actaplanin and 30 g./T. of monensin and 40 g./T. of actaplanin. The optimum in this experiment was 10 g./T. of monensin and 40 g./T. of actaplanin which produced a 13.5% improvement in feed efficiency over untreated controls. All of the combinations evaluated, however, demonstrated unexpected interaction.

In another study, two hundred Hereford crossbred steers averaging about 565 pounds were employed in a 154-day trial to determine the efficacy of combinations of monensin (at 30 g./T.) and actaplanin (at 20 g./T., 40 g./T. and 60 g./T.). The steers were fed a corn silage or corn-soya-cob roughage diet ad libitum once a day, together with a cattle supplement. The animals were divided into five treatment groups of forty steers each. These treatment groups were maintained in open pens; five animals per pen so that each treatment group comprised eight pens. Individual treatments were then assigned at random to each of the eight pens so that each treatment was replicated four times within each ration group. The results of the 154-day study are given in Table III.

TABLE III

| Monensin grams/Ton | Actaplanin grams/Ton | Number of Animals Treated | Average Daily Weight Gain (lbs) | Average Daily Dry Matter Intake (lbs) | Feed Efficiency |
|---|---|---|---|---|---|
| 0 | 0 | 40 | 2.43 | 18.13 | 7.49 |
| 30 | 0 | 40 | 2.41 | 16.79 | 7.01 |
| 30 | 20 | 39[a] | 2.56 | 16.74 | 6.70 |
| 30 | 40 | 38[b] | 2.43 | 15.72 | 6.53 |
| 30 | 60 | 40 | 2.42 | 15.64 | 6.51 |

[a] one steer removed because of poor health
[b] two steers removed because they developed pneumonia The data from Table III demonstrate that steers fed monensin alone had daily weight gains similar to those of control animals, but experienced a 6.4 percent increase in feed efficiency. Animals receiving combinations of monensin and actaplanin experienced greatly improved feed efficiency.

Another study was designed to show the unexpected interaction of the polyether narasin in combination with actaplanin. Two hundred forty Hereford crossbred steers averaging about 700 pounds and about 18 months of age were employed. The animals were fed corn silage and high moisture corn, plus two pounds per head per day of the following cattle supplement:

| Ingredient | Percent by Weight |
|---|---|
| Alfalfa meal | 12.00 |
| Urea | 5.00 |
| Soybean meal | 45.40 |
| Trace mineral premix | 0.80 |
| Calcium carbonate | 11.00 |
| Dicalcium phosphate | 8.00 |
| Potassium chloride | 5.00 |
| Salt | 10.00 |
| Vit E | 1.40 |
| Vit A-D3 | 1.40 |
| | 100.00 |

The treatments comprised three dose levels of narasin (0, 4 and 12 g./T.) and four dose levels of actaplanin (0, 10, 20 and 40 g./T.). The animals were randomly assigned to four blocks of twelve partially sheltered pens, each with five animals per pen. The treatments were allotted at random within the four 12-pen blocks such that each treatment was represented in each block. Each of the twelve treatments was replicated four times. The results of this 140-day study are presented in Tables IV-VI.

TABLE IV

Average Daily Weight Gain In Pounds

| Narasin dosage g./T. | Actaplanin dosage (g./T.) | | | |
|---|---|---|---|---|
| | 0 | 10 | 20 | 40 |
| 0 | 2.51 | 2.54 | 2.66 | 2.59 |

TABLE IV-continued

Average Daily Weight Gain In Pounds

| Narasin dosage g./T. | Actaplanin dosage (g./T.) | | | |
|---|---|---|---|---|
| | 0 | 10 | 20 | 40 |
| 4 | 2.53 | 2.67 | 2.65 | 2.55 |
| 12 | 2.52 | 2.55 | 2.67 | 2.54 |

TABLE V

Average Daily Dry Matter Intake in Pounds

| Narasin dosage g./T. | Actaplanin dosage (g./T.) | | | |
|---|---|---|---|---|
| | 0 | 10 | 20 | 40 |
| 0 | 16.64 | 16.47 | 16.51 | 16.02 |
| 4 | 16.41 | 16.10 | 16.18 | 15.54 |
| 12 | 15.52 | 15.25 | 15.12 | 14.81 |

TABLE VI

Average Feed Efficiency

| Narasin dosage g./T. | Actaplanin dosage (g/T) | | | |
|---|---|---|---|---|
| | 0 | 10 | 20 | 40 |
| 0 | 6.64 | 6.47 | 6.19 | 6.18 |
| 4 | 6.46 | 6.03 | 6.09 | 6.07 |
| 12 | 6.18 | 5.97 | 5.69 | 5.83 |

The data in Tables IV–VI demonstrate that steers fed narasin alone at 12 g./T. had similar daily weight gain to untreated controls, but experienced a 7.2% decrease in feed intake. Steers fed actaplanin alone at 20 g./T. had improved daily gains of 5.9% with a slight decrease in feed intake. Combinations of narasin and actaplanin demonstrated an unexpected interaction so as to produce an unexpected improvement in both daily gain and feed efficiency. The largest improvement in this study occurred with the combination of 12 g./T. of narasin and 20 g./T. of actaplanin, which comprises a preferred embodiment of this invention.

In order to further demonstrate the unexpected interaction between a polyether and a glycopeptide according to this invention, data from the three studies described immediately above were combined and analyzed. The following figures report such data expressed as a percentage response when compared with untreated control animals.

Combined Daily Gain Data

| polyether dosage (g./T.) | Actaplanin dosage (g./T.) | | | |
|---|---|---|---|---|
| | 0 | 10 | 20 | 40 |
| 0 | 0 | 5.5 | 6.6 | 6.3 |
| X | 3.5 | 9.5 | 8.2 | 8.0 |
| 3X | 2.1 | 4.4 | 6.1 | 1.9 |

Combined Feed Efficiency Data

| polyether dosage (g./T.) | Actaplanin dosage (g./T.) | | | |
|---|---|---|---|---|
| | 0 | 10 | 20 | 40 |
| 0 | 0 | 1.3 | 4.4 | 5.8 |
| X | 2.4 | 7.1 | 7.6 | 10.3 |
| 3X | 6.4 | 9.4 | 10.3 | 11.9 |

X = 4 g./T. of narasin or 10 g./T. of monensin.
3X = 12 g./T. of narasin or 30 g./T. of monensin.

These data further demonstrate that a polyether and a glycopeptide interact in such a way to produce an unexpected greater biological response than can be achieved with either component when employed alone. The components of the combination will be employed in suboptimal amounts which, in combination, are synergistic to feed efficiency. An especially preferred embodiment is to employ a polyether and a glycopeptide in amounts which, in combination, produce a feed efficiency response that is greater than that achieved with either component when employed alone at its respective optimal dose level.

Further analysis of the data generated as described above demonstrated that when the individual components of the present combination are employed in amounts that are less than their respective individual optimal dose levels, an unexpected increase in feed utilization efficiency attributable to an interaction is realized. When the components are utilized in amounts that are about their respective optimal dose levels when used alone, the combination causes an unexpected increase in feed utilization efficiency, which is believed the result of continued unexpected interaction. The results of this further analysis of data is presented below:

| | Feed efficiency | | |
|---|---|---|---|
| | Monensin dosage g./T. | | |
| | 0 | 10 | 30 |
| 0 | 6.09 | 5.95 | 5.70 |
| | | Δ0.14 | Δ0.39 |
| 10 | 6.00 | 5.65 | 5.52 |
| | Δ0.09 | EΔ0.23 | EΔ0.48 |
| | | OΔ0.44 | OΔ0.57 |
| 20 | 5.81 | 5.62 | 5.45 |
| | Δ0.28 | EΔ0.42 | EΔ0.67 |
| | | OΔ0.47 | OΔ0.64 |
| 40 | 5.73 | 5.48 | 5.39 |
| | Δ0.36 | EΔ0.50 | EΔ0.75 |
| | | OΔ0.61 | OΔ0.70 |

In the foregoing table, Δ is the change in feed efficiency of the treated group over the nontreated group. For example, the nontreated control group exhibit a feed to gain ratio of 6.09. Animals receiving 10 g./T. of monensin alone had a feed to gain ratio of 5.95. The change in efficiency is thus 0.14. The term "EΔ" is the change in efficiency expected with a combination, and is arrived at by adding the Δ values of the individual components at the appropriate dose levels. The term "OΔ" is the change in efficiency over nontreated controls actually observed with animals receiving the combination. The data show that the observed increase in feed efficiency is greater than expected with each combination evaluated, and is in fact the result of an unexpected interaction with all combinations except monensin at 30 g./T together with actaplanin at either 20 or 40 g./T.

A further embodiment provided by this invention is a method for increasing feed utilization efficiency and promoting growth in ruminants. Such method is accomplished by administering to a ruminant having a developed rumen function a propionate increasing amount of a combination of a glycopeptide feed efficiency enhancer and a polyether antibiotic feed efficiency enhancer as hereinabove described. The method preferably will be carried out by orally administering the dosage of each compound which together are synergistic to feed efficiency enhancement, or which are the respective optimal doses of the individual components when employed alone. Such dosage will accordingly be a propionate-increasing amount of a combination of propionate-increasing agents. A preferred method for improving feed efficiency comprises administering a propionate-increasing amount of a combination comprised of monensin and a glycopeptide selected from actaplanin and avoparcin, most preferably actaplanin. Another preferred method will employ the combination of narasin and actaplanin. As already pointed out, the compositions of the invention can be administered orally in the form of feed additives, controlled release boluses, licks, water, and the like. A preferred method of oral administration of a combination of this invention is as a feed additive. Such method employs a feedstuff comprised of a combination of the invention admixed with a suitable carrier therefor, such as ground corn cobs, rice hulls or the like. Another preferred method employs a slow-release bolus. The latter method is especially preferred in the treatment of range fed ruminants such as cattle and sheep.

The following detailed examples are provided in an effort to illustrate specific aspects of this invention. As pointed out above, a particularly preferred composition provided by this invention comprises a polyether, especially narasin or monensin, and actaplanin. Actaplanin, like monensin and narasin, is comprised of several factors, all of which can be employed according to this invention, either individually or as a mixture of two or more factors. Also, a pseudo-aglycone common to all factors recently has been isolated and shown to possess useful biological activity, as described by Debono in U.S. Pat. No. 4,322,343. A preferred embodiment of the invention is practiced employing any of newly isolated $B_1$, $B_2$, $B_3$, factors $C_{1a}$, $C_3$, E, G related factors. These and similar individual factors are fully described in U.S. Pat. No. 4,322,406 by Debono, Merkel, Weeks and Cole; and in co-pending application of Weeks, Hershberger, Merkel and Wild. As used herein, "actaplanin" means any of the individual factors, the pseudo-aglycone, or mixtures of any such components.

Since an especially preferred method of improving feed efficiency employs actaplanin, the preparation of the actaplanin complex and certain of the individual factors of actaplanin, as well as the pseudo-aglycone, will be provided in order to further illustrate a preferred aspect of this invention.

EXAMPLE 1

Submerged aerobic cultural conditions are preferred for the production of the antibiotic A-4696 (actaplanin) factors. Relatively small amounts of the antibiotics can be produced by shake flask culture; however, for the preparation of large amounts, submerged aerobic culture in sterile tanks is preferred. The culture medium in the sterile tank can be inoculated with a mycelial fragment suspension.

Accordingly, it is desirable to produce a vegetative inoculum of the organism by inoculating a relatively small quantity of culture medium with the mycelial fragments of the organism, and when a young active vegetative inoculum is obtained, to aseptically transfer it to the large tank. The medium in which the vegetative inoculum is grown can be the same as that utilized for large scale production of the antibiotic A-4696 factors, although other media can be employed.

The antibiotic A-4696 factor producing *Actinoplanes missouriensis* strains ATCC 31680, ATCC 31681, ATCC 31682, and ATCC 31683, grow at temperatures between 20° and 40° C. The largest amounts of A-4696 factors appear to be produced at a temperature of about 30° C.

Sterile air is blown through the culture medium in the submerged aerobic culture process. The volume of air sparged into the culture medium varies from about 0.1 to about 1.0 volume of air per minute per volume of culture medium. The most efficient growth and antibiotic production are achieved when the volume of air is at least ½ volume of air per minute per volume of culture medium.

The rate of production of antibiotic A-4696 factors and the concentration of antibiotic activity in the culture medium can be followed during the growth period by testing samples of the fermentation broth for antibiotic activity against organisms known to be susceptible to the antibiotic. One such assay organism useful to illustrate the present invention is *Bacillus subtilis*. The bioassay can be carried out by the standard cup-plate methods, or by the paper disc assay on agar plates.

Generally, maximum production of the antibiotic occurs within about 4 to 6 days in shake flasks or submerged aerobic culture fermentations.

Antibiotic A-4696 for subsequent isolation of antibiotic A-4696 factors $B_1$, $B_2$, $B_3$, $C_{1a}$, $C_3$, and $E_1$ can be isolated from the culture medium and separated from other substances which may be present by adsorptive and extractive techniques. Adsorptive techniques are preferred because such procedures avoid the use of large volumes of solvents required in extraction processes.

Since the procedures for preparing actaplanin are substantially the same when using strains ATCC 31680 (for isolation of antibiotic A-4696 factors $B_2$ and $C_3$), ATCC 31682 (for isolation of antibiotic A-4696 factors $B_1$ and $C_{1a}$), and ATCC 31683 (for isolation of antibiotic A-4696 factors $B_3$ and $E_1$), the use of only ATCC 31682 is presented here for simplicity. Certain procedural differences relating to the production medium and the use of strain ATCC 31683 are also presented herein where appropriate.

A. Shake Flask Fermentation

Mycelial fragments of *Actinoplanes missouriensis*, illustrated here with strain ATCC 31682 for simplicity, were inoculated on a nutrient agar slant having the following composition:

| Ingredient | Amount |
|---|---|
| Cerelose | 0.5% |
| Potato dextrin | 2.0% |
| *Nutrisoy flour | 1.5% |
| Yeast extract | 0.25% |
| $CaCO_3$ | 0.1% |
| Agar | 2.0% |

*Nutrisoy flour is obtained from Archer Daniels Midland Company, 4666 Faries Parkway, Decatur, Illinois 62526.

The slant inoculated with ATCC 31682 was then incubated for 6 days at 30° C. The culture does not sporulate so it is necessary to macerate the mycelial mat with a sterile pipette. The macerated mature culture was covered with sterile distilled water and scraped carefully with the pipette or a sterile rod to obtain a mycelial suspension.

The suspension thus obtained was used to inoculate 100 ml. of a sterile vegetative medium having the following composition:

| Ingredient | Amount |
|---|---|
| Cerelose | 0.5% |
| Potato dextrin | 2.0% |
| Nutrisoy flour | 1.5% |
| Yeast extract | 0.25% |
| $CaCO_3$ | 0.1% |

The inoculated vegetative medium was grown for 48 hours at 30° C. on a rotary shaker operating at 250 rpm. Ten ml. of the inoculated vegetative medium was inoculated into 100 ml. of a sterile "bump" medium of the following composition.

| Ingredient | Amount |
|---|---|
| Cerelose | 0.5% |
| Yeast | 0.25% |
| Nutrisoy flour | 1.5% |
| Corn starch | 2.0% |
| $CaCO_3$ | 0.1% |
| Sag 471* | 0.05% |

*silicone antifoam agent available from Union Carbide

The inoculated "bump" medium was incubated for 24 hours at 30° C. with constant shaking on a rotary shaker operating at 250 rpm.

Four-tenths ml. of the "bump" medium was inoculated into 100 ml. portions of a production medium of the composition shown below contained in 500 ml. Erlenmeyer flasks, and sterilized at 121° C. for 30 minutes.

| Ingredient | Amount |
|---|---|
| Cerelose | 1.0% |
| Corn starch | 3.5% |
| Sucrose | 3.0% |
| Molasses | 1.5% |
| Yeast | 1.0% |
| Proflo (Cotton seed flour) | 1.0% |
| $CaCO_3$ | 0.2% |
| $K_2HPO_4$ | 0.05% |
| $(NH_4)_2SO_4$ | 0.025% |
| $MgSO_4.7H_2O$ | 0.5% |
| Sag 471 | 0.03% |

The production fermentation was shaken for about 96 hours at a temperature of 30° C. on a rotary shaker operating at 250 rpm. The pH at the end of the fermentation cycle was about 8.0.

For production of antibiotic A-4696 factors $B_3$ and $E_1$, strain ATCC 31683 was used to prepare the "bump" medium according to the teaching disclosed above. Four-tenths ml. of the strain ATCC 31683 inoculated "bump" medium was inoculated into 100 ml. portions of a production medium of the composition shown below contained in 500 ml. Erlenmeyer flasks, and sterilized at 121° C. for 30 minutes.

| Ingredient | Amount |
|---|---|
| Cerelose | 1.0% |
| Yeast | 2.0% |
| $CaCO_3$ | 0.2% |
| $K_2HPO_3$ | 0.05% |
| $(NH_4)_2SO_4$ | 0.025% |
| Sag 471 | 0.03% |

The production fermentation was shaken for about 96 hours at a temperature of 30° C. on a rotary shaker operating at 250 rpm. The pH at the end of the fermentation cycle was about 8.0.

B. 40-liter tank fermentation

The preparation of the inoculum proceeded through the incubation of the "bump" medium detailed under section A, above. Twenty-five liters of a production medium as outlined above was sterilized by autoclaving at 121° C. for 30 minutes and charged into a 40 l. capacity fermentation tank. One-hundred ml. of "bump" medium was inoculated into the sterile production medium. The inoculated production medium was allowed to ferment for 4 days at 30° C. The fermentation was aerated with sterile air in an amount of about one-half volume of air per volume of culture medium per minute. The fermenting production medium was agitated with a mixer utilizing an impeller of a proper size and turning at an appropriate rpm to insure adequate mixing of air with the medium. The pH of the culture medium gradually increased from an initial level of about 6.5 to about 8.0 as the fermentation proceeded. The fermentation can be scaled up further by increasing the medium and inoculum in accordance with the ratios and procedures taught hereinabove.

In this way a larger quantity of the fermentation broth can be conveniently produced for isolation of the antibiotic A-4696 factors.

C. Isolation of Antibiotic A-4696

The fermentation broth (3800 l.) prepared according to the above procedure was filtered after the addition of 5% (wt/vol) filter aid (Celite 545). The filter cake was resuspended in deionized water (3600 l.) and the pH of the aqueous suspension was adjusted to pH 10.5 using aqueous sodium hydroxide. The suspended solids were separated by filtration and washed with water. The filtrate and the washings were combined and the resulting solution was acidified with 20% (wt/vol) aqueous sulfuric acid to pH 4.5. The acidic solution was clarified by filtration using 1% filter aid (Celite 545). The clear solution was passed through a column (1.8×5 ft.) containing 350 l. of Amberlite IRA-116 (Na+ form) and the column washed with deionized water (1200 l.). The IRA-116 resin was removed from the column and eluted batchwise at pH 10.5 with an aqueous solution of sodium hydroxide (total 1000 liters). The resin eluate was neutralized (pH 7) with 20% (wt/vol) aqueous sulfuric acid, then washed with three portions of deionized water (150 liters total). The water washes were neutralized and combined with the neutralized eluate. The resulting solution was concentrated and subsequently freeze dried. The preparation of the crude complex varied in color from tan to dark brown.

D. Removal of Salts from Crude Antibiotic A-4696

The crude complex (1.0 kg) was slowly added with vigorous stirring to deionized water (1.5 liters). The resulting suspension was stirred for twenty minutes and was subsequently neutralized (pH 7) using a 10% aqueous ammonium hydroxide solution. The insoluble antibiotic A-4696 complex was separated by vacuum filtration, washed with deionized water, and freeze dried. The dried, desalted complex was recovered in approximately 80% yield (based on bioactivity).

E. Purification of Desalted Antibiotic A-4696

The dried, desalted complex (300 g.) was suspended in deionized water (2 liters), and the pH of the suspension was adjusted to pH 2.7 by addition of 3 N aqueous hydrochloric acid. The acidified solution was centrifuged for 40 minutes at 2500 rpm. The supernatant was decanted and loaded on a column (8×85 cm) containing 6 liters of decolorizing resin (Duolite S761). The activity was eluted with deionized water at a flow rate of 30 ml/min. The elution was monitored by thin layer chromatography. The antibiotic A-4696-containing effluent was concentrated (3 mm., 35° C.) to a volume of 3 liters and freeze dried. The decolorized complex was recovered as a white-to-tan solid in approximately 70% yield (based on bioactivity).

F. Isolation of Antibiotic A-4696 Factor $B_1$, $B_2$, $B_3$, $C_{1a}$, $C_3$, and $E_1$ Hydrochloride Salt The dried, decolorized antibiotic A-4696 complex (10 g. prepared according to the procedure outlined above) was dissolved in 100 ml. of deionized water. The resulting aqueous solution was filtered and loaded on a chromatography column (5×100 cm.) containing 2 liters of polyamide (Machery & Nagel SC6). The column was eluted with deionized water and 200–300 fractions (25 ml. each) were collected. The elution was monitored by UV-activity and by thin layer chromatography. Fractions were combined according to TLC identity and freeze dried. For some of the separations it was necessary to double the column length (200 cm.) by using two of the polyamide columns in line. Additional purification was achieved by repeated chromatography.

The procedures outlined in A-F above are followed using strain ATCC 31682, when isolation of antibiotic A-4696 factor $B_1$ and $C_{1a}$ is desired, using strain ATCC 31680 when isolation of A-4696 factor $B_2$ and $C_3$ is desired, and using strain ATCC 31683 when production of antibiotic factor A-4696 $B_3$ and $E_1$ is desired. While other Actinoplanes strains produce the above aforementioned factors, the strains disclosed are preferred for production of the antibiotic A-4696 factors recited herein.

EXAMPLE 2

An alternative method for isolating antibiotic A-4696 factors $B_1$, $B_2$, $B_3$, $C_{1a}$, $C_3$, and $E_1$ as hydrochloride salts using a single *Actinoplanes missouriensis* strain is as follows:

The dried, decolorized antibiotic A-4696 complex (200 mg. prepared from Strain 31683 according to the teaching of Example 1, A-E above) was dissolved in about 2 ml. distilled water. The resulting aqueous solution was filtered and separated by column chromatography using reversed phase adsorbents such as, for example, Li Chroprep ® RP-18* as the stationary phase and aqueous acetonitrile gradients containing triethylamine phosphate as the mobile phase. Although it is understood that those skilled in the art will vary the acetonitrile concentration gradient depending upon the composition of a particular fermentation, a preferred concentration gradient is 10–40%. The column effluent was monitored by UV-activity and fractitons containing the individual factors were collected. The acetonitrile was removed by evaporation under high vacuum and the resulting aqueous solutions were freeze dried. The freeze dried chromatography fractions were then redissolved in distilled water, adsorbed on reversed phase adsorbents such as, for example, Sep Pak ® C18 cartridges ** and eluted with 50% aqueous methanol. The aqueous solutions containing the individual antibiotic A-4696 factors were evaporated to dryness and the purified antibiotic A-4696 factors were then recovered as dry amorphous solids.

*Available from E. Merck, Darmstadt, Germany
**Available from Waters Associates Inc., Milford, Massachusetts

EXAMPLE 3

Preparation of Antibiotic A-4696 Pseudo-Aglycone Dihydrochloride Salt

Antibiotic A-4696 complex (2.0 g. prepared according to the teaching of Example 2) was dissolved in 50 ml. of 5% methanolic HCl and refluxed for 70 minutes. The reaction mixture was evaporated to dryness at 35°–40° C. under reduced pressure. The residue was diluted with a small amount of water which resulted in the formation of a solid which was isolated by filtration. The solid was air dried, dissolved in a small amount of methanol and reprecipitated by the addition of acetonitrile until a granular solid formed. The desired product was then filtered, dried, and was shown by high performance liquid chromatography (HPLC) to be a single homogeneous product. The identity and structure of the desired product were confirmed by plasma desorption mass spectroscopy, proton nuclear mass resonance, and elemental analysis.

Antibiotic A-4696 pseudo-aglycone dihydrochloride salt can also be prepared, in accordance with the above teaching, by hydrolysis of individual factors or mixtures of factors contained in the antibiotic A-4696 complex.

EXAMPLE 4

Preparation of Actaplanin factor G

A nutrient agar slant having the following composition was prepared.

| Ingredient | Amount (% by weight) |
| --- | --- |
| Cerelose | 0.5 |
| Potato dextrin | 2.0 |
| Nutrisoy flour | 1.5 |
| Yeast extract | 0.25 |
| Calcium carbonate | 0.1 |
| Agar | 2.0 |

The slant was inoculated with ATCC 31681 and then incubated at 30° C. for about 6 days. After incubation the mycelial mat on the slant culture was covered with sterile distilled water and scraped loose with a sterile rod or loop to obtain an aqueous suspension of the mycelium.

The aqueous suspension was used as the inoculum for 100 ml. of sterile vegetative medium having the same composition as the agar slant medium described above. The inoculated medium was incubated for about 48 hours at a temperature of about 30° C. During incubation the vegetative medium was agitated on a rotary shaker operating at about 250 rpm. Following the growth of the vegetative medium, 10 ml. of the grown culture was withdrawn and used as the inoculum for sterile bump medium having the following composition.

| Ingredient | Amount (% by weight) |
| --- | --- |
| Cerelose | 0.5 |
| Yeast | 0.25 |
| Nutrisoy flour | 1.5 |
| Corn starch | 2.0 |
| Calcium carbonate | 0.1 |

-continued

| Ingredient | Amount (% by weight) |
| --- | --- |
| Antifoam agent (Sag 471) | 0.05 |

The bump medium was incubated for about 24 hours at a temperature of about 30° C. while agitated on a rotary shaker at 250 rpm. The grown bump medium was then used to inoculate the A-4696G sterile production medium of the following composition.

| Ingredient | Amount (% by weight) |
| --- | --- |
| Cerelose | 2.5 |
| Yeast | 2.0 |
| Calcium carbonate | 0.2 |
| Ammonium sulfate | 0.025 |
| Dipotassium acid phosphate | 0.05 |
| Glycerine | 1.5 |
| Molasses | 1.5 |
| Corn starch | 3.5 |
| Antifoam agent (Sag 471) | 0.03 |

The fermentation was carried out for 143 hours at a temperature of about 30° C. with stirring and aeration with sterile air at a rate of about one-half volume of air per volume of culture medium per minute. During the fermentation the pH of the medium increased from an initial pH of about 6.5 to a pH of about 8.0. At the end of the fermentation (about 143 hours) the medium contained about 5,000 units of activity per ml.

A portion (30 liters) of the whole fermentation broth was diluted with 30 liters of acetone and the pH adjusted to 1.8 with 6 N hydrochloric acid. The acidified whole broth was filtered using a filter aid and the insolubles were washed with water on the filter. The pH of the filtrate was adjusted to 3.5 with 150 ml. of 50% sodium hydroxide and the filtrate concentrated in vacuo to a volume of 29 l. The pH was readjusted from 2.2 to 3.1 with sodium hydroxide and refiltered to remove insolubles. The filtrate containing the antibiotic was passed over a 3-inch diameter column containing 5 liters of Mitsubishi Dianion HP-20 non-functional resin (styrene-divinylbenzene resin) pretreated with methyl alcohol and washed with water. The flow rate was 250 ml/min. After adsorption of the antibiotic on the resin, the column was washed with 5 liters of water and eluted successively with 21 liters of 21% aqueous methyl alcohol, 15 liters of 50% aqueous methyl alcohol, and 15 liters of 50% aqueous acetone. Four-liter fractions of wash and eluate were collected. Fractions 8, 9 and 10 contained the majority of the antibiotic activity and was also free from most of the impurities. Fractions 8, 9 and 10 were combined and concentrated to a volume of 6 liters under vacuum. After the pH of the concentrate was adjusted to pH 6.8 with aqueous sodium hydroxide, the concentrate was poured into 60 liters of iso-propyl alcohol. A-4696G precipitated from the diluted concentrate and was filtered and dried. There were obtained 54.2 g. of A-4696G in substantially pure form. The A-4696G obtained was further purified by HPLC.

A-4696G free base is dissolved in methyl alcohol and the solution diluted with 1 N hydrochloric acid. After stirring the acidified solution is diluted with acetone to precipitate the A-4696G dihydrochloride salt.

EXAMPLE 5

A cattle feedstuff ration containing an amount effective in increasing feed efficiency of a combination of this invention comprises the following ingredients:

|  | Percent |
| --- | --- |
| Coarse ground corn | 69.95 |
| Ground corncobs | 10.00 |
| Soybean meal (50% protein) | 8.00 |
| Alfalfa meal | 5.00 |
| Molasses | 5.00 |
| Urea | 0.60 |
| Dicalcium phosphate | 0.50 |
| Calcium carbonate | 0.50 |
| Salt | 0.30 |
| Vitamin A and $D_2$ premix | 0.07 |
| Vitamin E premix | 0.05 |
| Trace mineral premix | 0.03 |
|  | 100.00 |

A combination of 30 grams of monensin and 30 grams of acetaplanin is uniformly mixed with one ton of the above ingredients. Such feedstuff is administered orally to feeder calves at the rate of about 5 to about 30 pounds per day for effective increase in the efficiency of feed utilization.

EXAMPLE 6

To the feed composition of Example 5 is added a uniform mixture of 30 grams of monensin and 30 grams of avoparcin. The feedstuff is administered orally to feeder calves for effectively increasing ruminant propionate production, which is manifested as an increase in the efficiency of feed utilization.

EXAMPLE 7

A composition comprised of 8 grams of narasin and 15 grams of actaplanin is mixed uniformly with one ton of fodder silage. Such feedstuff is orally administered to feeder calves for effective increase in feed utilization efficiency.

EXAMPLE 8

Controlled release formulation for increasing rumen propionate production in range fed feeder calves To a stirred solution of 150 ml. of dichloromethane containing 22.0 g. of a copolymer derived from about 80 percent by weight of lactic acid and about 20 percent by weight of glycolic acid, having an inherent viscosity of about 0.19, is added in one portion a uniform mixture, 12.0 g. of monensin sodium salt and 12.0 g. of actaplanin. The solution is stirred at ambient temperature for ten minutes and then the solvent is removed by evaporation under reduced pressure. The solid mass that is obtained is ground and heated to about 100° C. and packed into a steel open-ended capsule measuring 35 mm × 50 mm and weighing 98.8 g. Final weight of the packed capsule is 142.8 g.

Alternatively, separate controlled release formulations of monensin and of actaplanin can be prepared and placed in two separate delivery devices or the like. The two devices can then be administered to a ruminant such that the animal receives an effective daily dose of the combination of this invention.

The filled capsule is orally administered to a feeder calf via a balling gun. The calf is then permitted to graze freely on pasture. The controlled release bolus thus administered delivers a continuous and effective amount of the propionate increasing combination over about a three month period. Additional boluses can be administered as desired.

I claim:

1. A composition useful for improving the efficiency of feed utilization by ruminants having a developed rumen function comprising as a first component a polyether antibiotic and as a second component a glycopeptide antibiotic, said components being present in combination in amounts which are about their respective optimal dose levels when employed alone, or are suboptimal dose levels which interact to increase feed utilization efficiency.

2. A composition of claim 1 comprising as a first component a propionate-increasing amount of a polyether antibiotic selected from monensin, ionomycin, laidlomycin, nigericin, grisorixin, dianemycin, Compound 51,532, lenoremycin, salinomycin, narasin, lonomycin, X-206, alborixin, septamycin, A-204, Compound 47,224, etheromycin, lasalocid, mutalomycin, K41, isolasalocid A, lysocellin, X-14766A, A-23187 or A-32887, and a second component which is a glycopeptide antibiotic selected from actaplanin, avoparcin, A35512, A477, ristocetin, or vancomycin.

3. The composition of claim 2 wherein the polyether antibiotic propionate enhancer is selected from monensin, narasin, lasalocid, salinomycin, A-204, lonomycin, X-206, nigericin, or dianemycin.

4. The composition of claim 3 wherein the polyether antibiotic employed is monensin, narasin, lasalocid or salinomycin.

5. The composition of claim 4 wherein the polyether employed is monensin.

6. The composition of claim 4 wherein the polyether employed is narasin.

7. The composition of claim 2 wherein the glycopeptide propionate enhancer is selected from actaplanin, avoparcin, ristocetin, or vancomycin.

8. The composition of claim 7 wherein the glycopeptide propionate enhancer is selected from actaplanin or avoparcin.

9. The composition of claim 3 wherein the glycopeptide propionate enhancer is selected from actaplanin, avoparcin, ristocetin or vancomycin.

10. The composition of claim 9 wherein the glycopeptide employed is selected from actaplanin, or avoparcin.

11. The composition of claim 4 wherein the glycopeptide employed is selected from actaplanin, avoparcin, ristocetin, or vancomycin.

12. The composition of claim 5 wherein the glycopeptide employed is selected from actaplanin, avoparcin, A477, ristocetin or vancomycin.

13. The composition of claim 5 wherein the glycopeptide employed is selected from actaplanin or avoparcin.

14. The composition of claim 13, said composition comprising monensin and actaplanin.

15. The composition of claim 14, said composition being about 1 part by weight monensin and about 1 part by weight actaplanin.

16. The composition of claim 6 wherein the glycopeptide employed is selected from actaplanin or avoparcin.

17. The composition of claim 16, said composition comprising narasin and actaplanin.

18. The composition of claim 17, said composition comprising about 1 part by weight of narasin and about 1 to about 5 parts by weight of actaplanin.

19. A method for increasing the efficiency of feed utilization in ruminants having a developed rumen function which comprises orally administering a propionate-increasing amount of the composition of claim 1.

20. A method for increasing the efficiency of feed utilization in ruminants having a developed rumen function which comprises orally administering a propionate-increasing amount of the composition of claim 2.

21. The method of claim 20 wherein the composition administered comprises as a first component a polyether antibiotic selected from monensin, narasin, lasalocid, salinomycin, A-204, lonomycin, X-206, nigericin, or dianemycin, and as a second component a glycopeptide selected from actaplanin, avoparcin, ristocetin, or vancomycin.

22. The method of claim 21 wherein the composition administered comprises as a first component monensin and as a second component actaplanin.

23. The method of claim 21 wherein the composition administered comprises as a first component monensin and as a second component avoparcin.

24. The method of claim 21 wherein the composition administered comprises as a first component narasin and as a second component actaplanin.

25. The method of claim 21 wherein the composition administered comprises as a first component narasin and as a second component avoparcin.

26. A ruminant feedstuff useful in improving the efficiency of feed utilization in ruminants having a developed rumen function comprising a composition of claim 1 admixed with a suitable carrier therefor.

27. A ruminant feedstuff useful in improving the efficiency of feed utilization in ruminants having a developed rumen function comprising a composition of claim 2 admixed with a suitable carrier therefor.

28. The ruminant feedstuff of claim 27 wherein the composition is comprised of monensin and actaplanin.

29. The ruminant feedstuff of claim 27 wherein the composition is comprised of narasin and actaplanin.

* * * * *